April 3, 1928.　　　　　　　　　　　　　　1,664,911
F. J. WATTS
AUTOMOTIVE VEHICLE IGNITION SYSTEM
Filed March 7, 1927　　　2 Sheets-Sheet 1
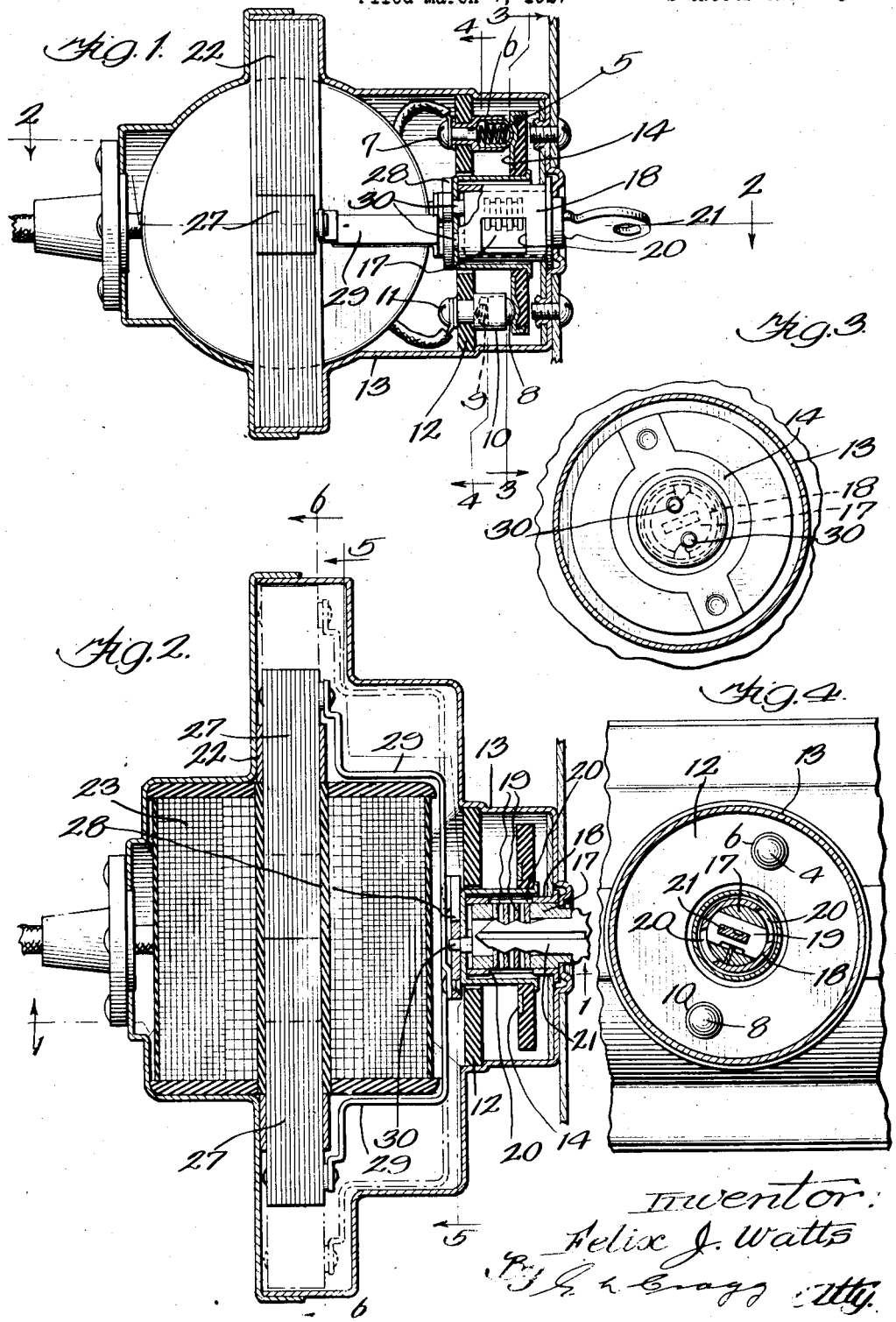

April 3, 1928. 1,664,911

F. J. WATTS

AUTOMOTIVE VEHICLE IGNITION SYSTEM

Filed March 7, 1927 2 Sheets-Sheet 2

Inventor
Felix J. Watts
By [signature] Atty.

Patented Apr. 3, 1928.

1,664,911

UNITED STATES PATENT OFFICE.

FELIX J. WATTS, OF BRONSON, MICHIGAN, ASSIGNOR TO HARRY A. DOUGLAS, OF BRONSON, MICHIGAN.

AUTOMOTIVE VEHICLE IGNITION SYSTEM.

Application filed March 7, 1927. Serial No. 173,582.

My invention relates to ignition circuit systems for internal combustion engines such, for example, as those employed in the power plants of automobiles or other automotive vehicles.

My invention relates more particularly to such a system which employs an inducing circuit that contains a primary winding and a second circuit which contains a spark plug or other gas igniting element and a winding that is in secondary relation to said primary winding. The primary or inducing circuit usually contains a battery or other source of direct current and a switch for opening and closing this circuit, the secondary or induced circuit that contains the spark plug or other gas igniting element being effective for its purpose when the primary circuit is closed. When the ignition system is employed in connection with the internal combustion hydrocarbon engine contained in the power plant of an automotive vehicle, it is the practice to provide a lock, usually key controlled, for locking the aforesaid switch in open adjustment to prevent unauthorized use of the automotive vehicle. The purpose of the lock, in prior structures, may be defeated by connecting the opened switch contacts by means of a jumper which would close the primary or inducing circuit. In practicing my invention I employ means for opening and closing one of said circuits, preferably the primary circuit, and enabling the impairment of the inductive relation of said windings when this circuit is closed by other than said means. In the preferred embodiment of the invention the primary winding is furnished with means which will so reduce its inducing action when the ignition circuit is locked open and is unwarrantably closed by a jumper or otherwise as to prevent the gas igniting element from functioning. In the preferred embodiment of the invention, I effect, for this purpose, a reduction in the inducing magnetic flux induced by the primary winding, this reduction being desirably secured by interposing sufficient reluctance in the magnetic circuit. To this end the primary winding is provided with a magnetizable core which is formed with relatively movable sections which are spaced apart when the reluctance is to be interposed for the purpose stated and during the time the ignition circuit is locked open and which are brought together when the ignition circuit is closed to enable the windings to function normally.

Figure 5:
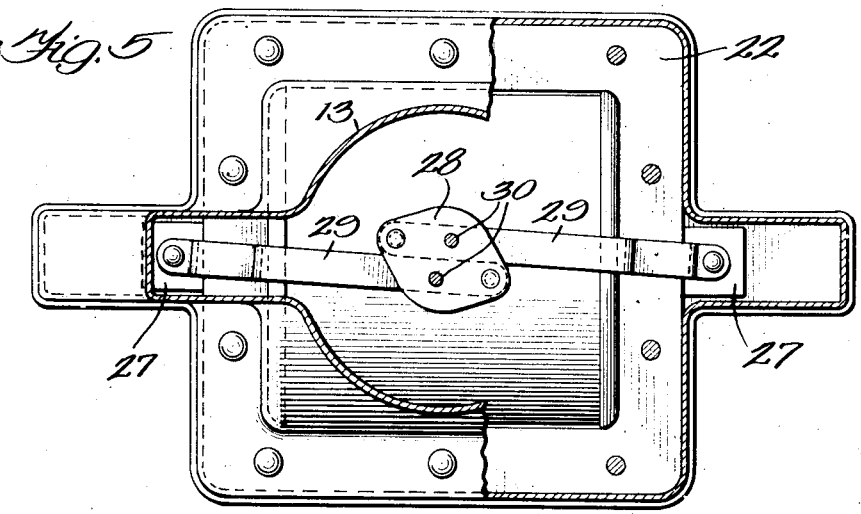
Figure 6:
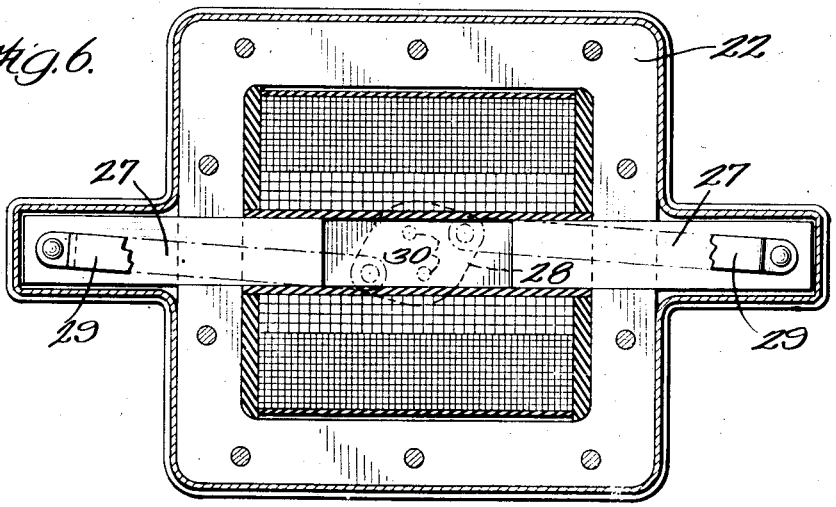
Figure 7:
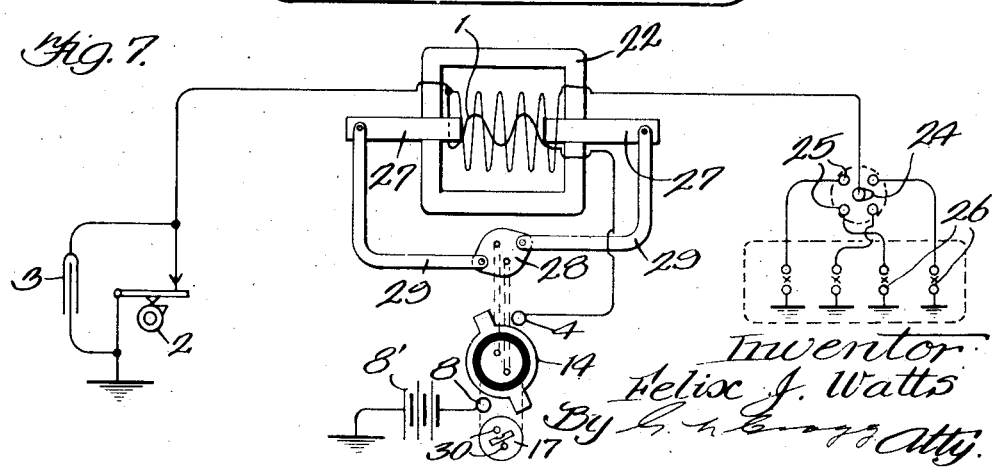

I will explain my invention more fully by reference to the accompanying drawing in which Fig. 1 is a sectional view of the preferred embodiment of my invention taken on line 1—1 of Fig. 2; Fig. 2 is a sectional view on line 2—2 of Fig. 1; Fig. 3 is a sectional view on line 3—3 of Fig. 1; Fig. 4 is a sectional view on line 4—4 of Fig. 1; Fig. 5 is a sectional view on line 5—5 of Fig. 2; Fig. 6 is a sectional view on line 6—6 of Fig. 2 but with parts in changed positions; and Fig. 7 illustrates one circuit arrangement.

The primary winding 1 has one terminal grounded through a circuit breaker 2 whose contacts are shunted by a condenser 3. The other terminal of this winding is connected with a metallic contact 4 which is in the nature of a plunger that is pressed upon by a coiled spring 5 contained in a metallic spring barrel 6, this spring barrel being furnished with a binding screw 7 for the attachment of a wire in electrical connection therewith. The primary circuit also has another metallic contact 8 that is grounded through the battery 8', this contact being spaced apart from the metallic contact 4 and being similarly pressed upon by a coiled spring 9 which is contained in a metallic spring barrel 10 that is furnished with a binding screw 11 for the attachment of a circuit wire thereto. Said spring barrels are mounted upon an insulating disc 12 which is contained in a suitable casing 13. A metallic contact bar 14 is suitably assembled with the tumbler barrel 17. This tumbler barrel turns within a shell 18 and carries tumblers 19 that project into the slots 20, in shell 18, when the key 21, constituting a removable handle for the metallic contact bar 14, is withdrawn and from which slots said tumblers are withdrawn when the key is inserted. When the tumblers are received in said slots, the metallic contact bar 14 is out of engagement with the contacts 4 and 8. When the tumblers are removed from said slots and the tumbler barrel is turned sufficiently, the contact bar is brought into electrical connection with said contacts 4 and 8. In the first adjustment, the inducing circuit containing the primary 1 is opened. In the second adjustment, this circuit is closed.

The windings are furnished with an 8-shaped core 22 about the middle member of which the primary winding is disposed and about which primary winding the secondary winding 23 is disposed. This secondary winding has one terminal grounded through the interrupter and has its other terminal connected with the revolving arm 24 of a distributor whose waiting contacts 25 are successively engaged by said arm. These waiting contacts are connected with the electrodes 26 of spark plugs or other gas igniting elements that are contained in the various cylinders of the internal combustion engine that is equipped with the ignition system. The middle member of the core is illustrated as being formed in two equal and aligned relatively movable sections 27. These core sections are substantially in contact when the ignition circuit is closed so that the primary and secondary windings are then in full inductive relation. When the ignition circuit is locked open, the core sections are moved apart to introduce a large air gap therebetween and which is sufficient to prevent the induction of sufficient current into the secondary circuit to operate the gas igniting element 26. If the stationary switch contacts 4 and 8 are bridged by a jumper when the contacting bar 14 is locked in circuit opening position, the reluctance introduced into the magnetic circuit of the core by the air gap between said core sections will be sufficient to so reduce the flux induced by the primary winding as to impair the inductive relation of the windings to an extent to prevent the formation of gas igniting sparks at the spark plugs. In the embodiment of the invention illustrated, the outer ends of said core sections 27 are united by a rocker arm 28 and links 29 that connect this rocker arm with said core sections. Said rocker arm is connected by the pins 30 with the tumbler barrel 17, so that when this barrel is turned to close the switch, said core sections are brought together and when turned to open the switch, said core sections are moved apart.

Changes may be made without departing from the invention.

Having thus described my invention, I claim:

1. The combination with primary and secondary windings having a magnetizable core establishing inductive relation therebetween; of circuits respectively containing said windings, the circuit that contains the secondary winding also containing a gas igniting element, said core being formed with relatively movable sections to enable the introduction of sufficient reluctance in the magnetic circuit containing said core to prevent said gas igniting element from functioning; and means for opening and closing one of said circuits and separating said core sections when this circuit is open and relatively approaching said core sections when this circuit is closed.

2. The combination with primary and secondary windings having a magnetizable core establishing inductive relation therebetween; of circuits respectively containing said windings, the circuit that contains the secondary winding also containing a gas igniting element, said core being formed with relatively movable sections to enable the introduction of sufficient reluctance in the magnetic circuit containing said core to prevent said gas igniting element from functioning; means for opening and closing one of said circuits and separating said core sections when this circuit is open and relatively approaching said core sections when this circuit is closed; and locking mechanism operating upon said means to lock the last aforesaid circuit open.

3. The combination with primary and secondary windings having a magnetizable core establishing inductive relation therebetween; of circuits respectively containing said windings, the circuit that contains the secondary winding also containing a gas igniting element, said core being formed with relatively movable sections to enable the introduction of sufficient reluctance in the magnetic circuit containing said core to prevent said gas igniting element from functioning; means for opening and closing one of said circuits and separating said core sections when this circuit is open and relatively approaching said core sections when this circuit is closed; and locking mechanism operating upon said means to lock the last aforesaid circuit open and inclusive of an operating element in actuating relation to said means.

4. The combination with inductively related primary and secondary windings; of circuits respectively containing said windings, the circuit that contains the secondary winding also containing a gas igniting element; a switch for opening and closing one of said circuits; means enabling the impairment of the inductive relation of said windings and adjustable into and out of functioning condition and coupled with said switch to be put in functioning condition when the latter circuit is opened by the switch; and locking mechanism serving to secure said switch in circuit opening position.

5. The combination with inductively related primary and secondary windings; of circuits respectively containing said windings, the circuit that contains the secondary winding also containing a gas igniting element; a switch for opening and closing one of said circuits; means enabling the reduction in the magnetic flux induced by the primary winding and adjustable into and out of functioning condition and coupled with said switch to be put in functioning condition when the latter circuit is opened by the switch; and locking mechanism serving to secure said switch in circuit opening position.

6. The combination with inductively related primary and secondary windings; of circuits respectively containing said windings, the circuit that contains the secondary winding also containing a gas igniting element; a switch for opening and closing one of said circuits; means enabling an increase in the reluctance in the circuit of the magnetic flux induced by the primary winding and adjustable into and out of functioning condition and coupled with said switch to be put in functioning condition when the latter circuit is opened by the switch; and locking mechanism serving to secure said switch in circuit opening position.

7. The combination with inductively related primary and secondary windings; of circuits respectively containing said windings, the circuit that contains the secondary winding also containing a gas igniting element; a switch for opening and closing one of said circuits; means enabling the impairment of the inductive relation of said windings and adjustable into and out of functioning condition and coupled with said switch to be put in functioning condition when the latter circuit is opened by the switch; and locking mechanism serving to secure said switch in circuit opening position and in actuating relation thereto.

8. The combination with inductively related primary and secondary windings; of circuits respectively containing said windings, the circuit that contains the secondary winding also containing a gas igniting element; a switch for opening and closing one of said circuits; means enabling the reduction in the magnetic flux induced by the primary winding and adjustable into and out of functioning condition and coupled with said switch to be put in functioning condition when the latter circuit is opened by the switch; and locking mechanism serving to secure said switch in circuit opening position and in actuating relation thereto.

9. The combination with inductively related primary and secondary windings; of circuits respectively containing said windings, the circuit that contains the secondary winding also containing a gas igniting element; a switch for opening and closing one of said circuits; means enabling an increase in the reluctance in the circuit of the magnetic flux induced by the primary winding and adjustable into and out of functioning condition and coupled with said switch to be put in functioning condition when the latter circuit is opened by the switch; and locking mechanism serving to secure said switch in circuit opening position and in actuating relation thereto.

10. The combination with inductively related primary and secondary windings; of circuits respectively containing said windings, the circuit that contains the secondary winding also containing a gas igniting element; means enabling an increase in the reluctance in the circuit of the magnetic flux induced by the primary winding and adjustable into and out of functioning condition; and locking mechanism serving to secure said means in functioning condition.

11. The combination with inductively related primary and secondary windings; of circuits respectively containing said windings, the circuit that contains the secondary winding also containing a gas igniting element; means enabling an increase in the reluctance in the circuit of the magnetic flux induced by the primary winding and adjustable into and out of functioning condition; and locking mechanism serving to secure said means in functioning condition.

In witness whereof, I hereunto subscribe my name.

FELIX J. WATTS.